Oct. 23, 1962  R. W. AUGUSTUS  3,059,790
RETRACTABLE REAR VIEW MIRROR
Filed Feb. 2, 1959  2 Sheets-Sheet 1
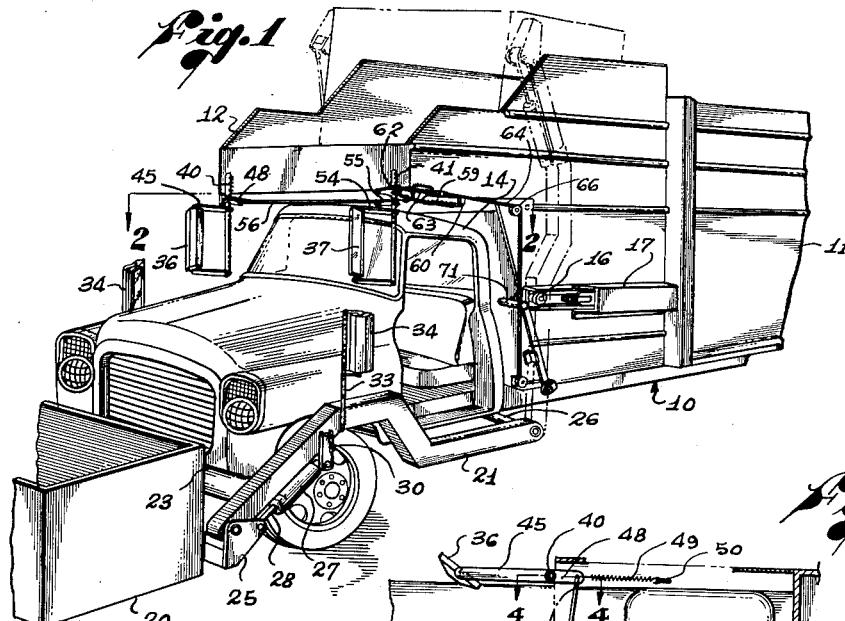
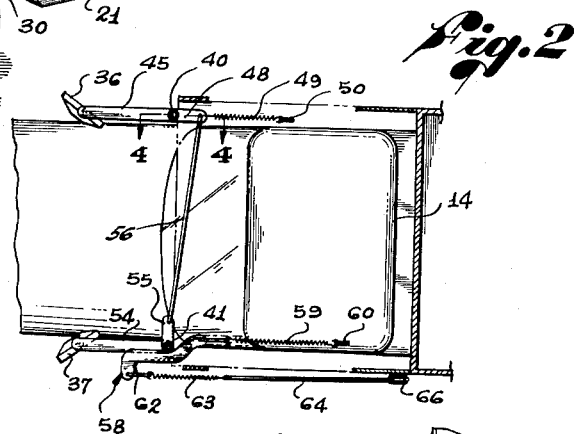
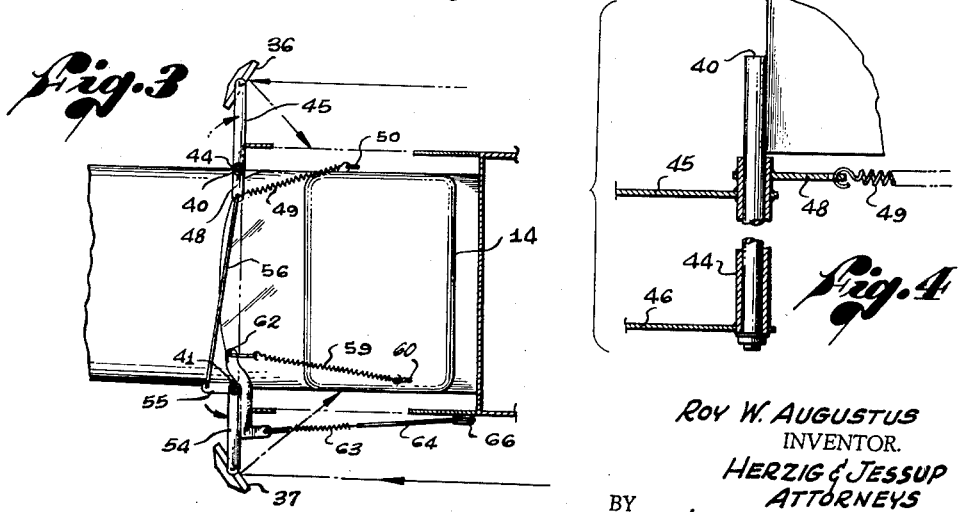
ROY W. AUGUSTUS
INVENTOR.
HERZIG & JESSUP
ATTORNEYS
BY
Warren T. Jessup Oct. 23, 1962  R. W. AUGUSTUS  3,059,790
RETRACTABLE REAR VIEW MIRROR
Filed Feb. 2, 1959  2 Sheets-Sheet 2

ROY W. AUGUSTUS
INVENTOR.
HERZIG & JESSUP
BY  ATTORNEYS

Warren T. Jessup

United States Patent Office 3,059,790
Patented Oct. 23, 1962

3,059,790
RETRACTABLE REAR VIEW MIRROR
Roy W. Augustus, Azusa, Calif.
(14602 E. Francisquito, Puente, Calif.)
Filed Feb. 2, 1959, Ser. No. 820,566
12 Claims. (Cl. 214—77)

This invention relates to a retractable rear view mirror and operating mechanism therefor adapted for use with trucks or other vehicles of the type having auxiliary components or equipment with which the normal position of a rear view mirror would interfere.

For example, refuse trucks may be conventionally equipped with a loading bucket or scoop at the front which is mechanically lifted by side arms up over the cab of the truck for dumping into the body or hauling compartment of the truck. Rear view mirrors as normally positioned at the sides of the driver's cab in position to provide the proper rear view are in the way of the side arms of such loading equipment.

It is the primary object of this invention to overcome the foregoing problem.

It is a further object of the invention to provide means whereby a rear view mirror or mirrors may be appropriately positioned for a proper rear view in trucks or vehicles of the type having attachments or equipment including parts which in operation pass the side or sides of the vehicle cab and would ordinarily be obstructed by the support or supports for the rear view mirror or mirrors.

A further object of the invention is to provide a retractable mounting means for a rear view mirror adapted for use with trucks or vehicles having loading means requiring retraction of the rear view mirror from a normal position for operation thereof.

A further object of the invention is to provide a retractable rear view mirrow means as in the foregoing object having interconnecting means whereby operation of the loading mechanism appropriately positions the rear view mirror.

Another object of the invention is to provide an assembly as in the foregoing object including mirrors on both sides of the vehicle and means for actuating them between extended and retracted positions by movement of the loading means.

Another object of the invention is to provide retractable mirror means as in the foregoing object wherein the mirrors are moved to one position in unison by springs and are caused to move to their opposite position in response to operation of the loading means.

Further objects and numerous advantages of the invention will become apparent from the following detailed description and annexed drawings wherein:

FIG. 1 is a perspective view of a truck embodying the invention;

FIG. 2 is a plan view of the operating mechanism for a pair of rear view mirrors;

FIG. 3 is a view like that of FIG. 2 with the mirrors in extended position;

FIG. 4 is a detail view taken along the line 4—4 of FIG. 2;

Figure 5:
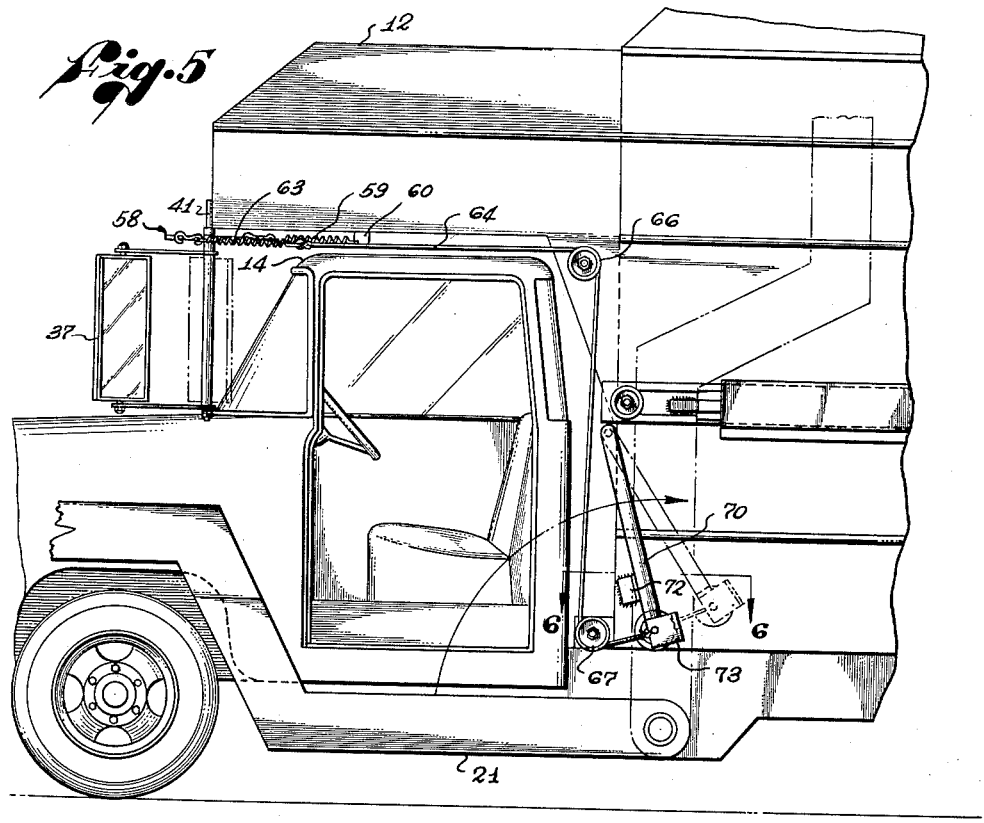
FIG. 5 is a side view of the truck of FIG. 1.

Referring now more particularly to FIGS. 1 and 5 of the drawings, numeral 10 designates by way of example a truck which may be a refuse truck having a body or hauling compartment as designated at 11, a portion of which as shown at 12 overhangs the cab 14 of the truck or vehicle.

The truck may be of a type having a wall or partition within the hauling compartment 11 which operates to compress the material loaded in the truck. Such means may include a transversely extending member as designated at 16 operated by hydraulic means as shown at 17 on the side of the truck.

The truck as shown has power operated loading means including a bucket or scoop as designated at 20. The bucket 20 is lifted by a frame including side arms, one of which is shown at 21, these arms being connected at the front by a cross member 23. The arms 21 have the shape shown. At the front end of the arm 21 there is pivotally attached a U-shaped bracket or lever member 25 there being a similar member at the opposite side and the bucket 20 being attached to these members. At their inner ends the side arms 21 are attached to a transverse operating shaft 26 and the frame comprised of the members 21 and the bucket 20 may be lifted by power means not shown acting through the shaft 26 by way of example to the broken line position as shown in FIGS. 1 and 5. In this position the bucket 20 is over the hauling compartment 11 of the truck 10.

Each of the pivoted members 25 is hydraulically operated for tilting the bucket 20 when it is over the compartment 11 for dumping its contents into the truck. For operating member 25 as may be seen in FIG. 1 there is provided a hydraulic cylinder 27 having a stem 28 connected to the member 25. The opposite end of the cylinder 27 is attached to a bracket 30 which is secured to the arm 21 as shown. The lifting means for the bucket 20 may be operated and controlled by any conventional means not shown in detail. The hydraulic cylinders 27 also may be conveniently controlled by appropriate means not shown for tilting the bucket 20.

Numeral 33 designates a post upstanding from the arm 21 and carrying a rear view mirror 34.

FIG. 1 shows in full lines the position of the bucket 20 in front of the truck wherein the bucket is to be filled with material to be loaded into the truck in the manner described. During travel when material is being transported the bucket 20 is in an upright position over the compartment 11 as indicated by the broken line showing in FIGS. 1 and 5. As will be observed when the bucket 20 is lowered to the position shown in FIG. 1, the side arms 21 pass the sides of the cab 14 and rear view mirrors in their normal position spaced out from the cab would obstruct the passage of the side arms. Rear view mirrors are provided as may be seen in FIG. 1 and there are means for retracting them inwardly when the bucket 20 is lowered.

The rear view mirrors are indicated at 36 and 37 and their mountings are shown in detail in FIGS. 2, 3 and 4. Numeral 40 designates a stem attached to the front of the overhang 12 at one side and extending downwardly therefrom and numeral 41 designates a similar stem at the other side of the overhang 12. As may be seen in FIG. 4 on the stem 40 is a sleeve 44 having extending arms 45 and 46 which carry the mirror 36. FIG. 2 shows the mirrors in inwardly retracted position. The sleeve 44 has a shorter rearwardly extending arm 48 as may be seen in FIG. 2 and attached to the end of this arm is a coil spring 49 the other end of which is attached to a bracket 50 underneath the overhang 12.

The stem 41 has a similar sleeve on it having extending arms one of which may be seen at 54 in FIG. 2 supporting the mirror 37. The sleeve on stem 41 has a shorter inwardly extending arm 55 as may be seen in FIG. 2 which is connected to the end of arm 48 by a link 56 so as to cause the mirror supports to be operated in unison.

Connected to the sleeve on the stem 41 is an operating lever 58 having the shape shown in FIG. 2. The rear end of lever 58 is connected to a coil spring 59 the other end of which is connected to a bracket 60 underneath the overhang 12. The springs 49 and 59 normally urge the mirror assembly into the position shown in FIG. 2, which is the retracted position. When the mirrors are in their extended position as shown in FIG. 3, the springs 49 and 59 are stretched.

The lever 58 has a short outwardly extending portion 62 which is connected to a coil spring 63 the other end of which is connected to operating cable 64. The cable 64 passes over a grooved pulley 66 pivoted on a side of the truck and it also passes around another grooved pulley 67 pivoted on the side of the truck at a lower position as shown in FIGS. 1 and 5.

Figure 6:
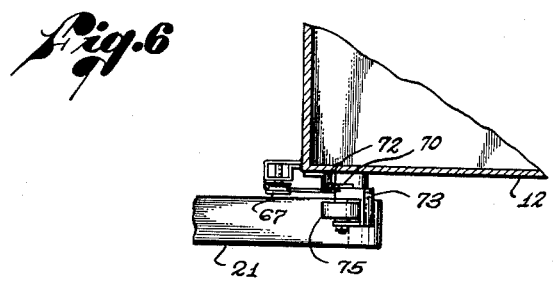
FIG. 6 is a detail view along the line 6—6 of FIG. 5.

Numeral 70 designates a lever pivoted at its upper end to the side of the truck on a member 71 as shown in FIG. 1. The lever 70 may engage a fixed stop 72 and at its lower end it carries a U-shaped bracket or housing 73 in which is journalled a roller 75 as may be seen in FIG. 6. The cable 64 after passing over the pulley 67 is attached to the lower end of the lever 70 as may be seen in FIG. 5.

The roller 75 lies in the path of the side arm 21. That is when the bucket 20 is lifted the side arm 21 engages the roller 75 as may be seen in Fig. 6. Movement of side arm 21 upwardly about shaft 26 tilts lever 70 in a counter-clockwise direction as may be seen in FIG. 5. This exerts a pull on the cable 64 and the lever 58 as seen in FIG. 2 is rotated through substantially 90° to the position shown in FIG. 3. Thus it may be seen that when the bucket 20 is in the position shown in FIG. 1 the mirrors 36 and 37 are retracted to an out of the way position. When the bucket 20 is lifted to the position over the truck compartment 11 the mirrors are extended to the position as shown in FIG. 3. As may be seen the arms 45 and 54 extend substantially straight out from the truck. Motion is imparted to the sleeve 44 operating the mirror 36 through the link 56. In the position shown in FIG. 3, the springs 49 and 59 are under tension. When the bucket 20 is lowered the side arm 21 moves away from the roller 75 allowing lever 70 to move in a clockwise direction releasing the tension in the cable 64 and allowing the springs 49 and 59 to return the mirrors to the retracted position shown in FIG. 2.

From the foregoing description of the structure and operation of the invention, its advantages will be apparent to those skilled in the art. For normal travel, the driver of the vehicle is provided with full and appropriate rear view through the rear view mirrors which are in an extended position to provide the views. When the bucket 20 is lowered the mirrors automatically retract to an out of the way inward position and remain in that position while the bucket is lowered. The re-extension of the mirrors when the bucket is lifted to traveling position is automatic in response to movement of the side arms. Accordingly the driver is provided with full rear view while traveling in a vehicle equipped with loading means or other comparable equipment as described. There is no interference between the mounting of the mirrors and the operation of the auxiliary equipment. The action of the retracting assembly is positive and requires no attention on the part of the operator.

When driving with the bucket 20 down, rear vision is provided by the mirrors 34 on the respective arms 21.

While there has been shown and described herein the invention in what is conceived to be the most practical and preferred embodiment, it is recognized that departures may be made therefrom within the scope of the invention which is not to be limited to the details disclosed herein but is to be accorded the full scope of the claims so as to embrace any and all equivalent structure and apparatus.

What is claimed is:

1. In combination with a truck having a driver's cab and loading means including arms movable along the sides of the cab: a rear view mirror mounted outside of the cab to be normally disposed in a first position for rear view by a driver, retractable mounting means for the mirror for retracting it to a second position inwardly out of the path of one of said arms, and actuating means connected to said retractable mounting means and engageable by said loading means for retracting said mirror to said second position when the loading means operates.

2. The device of claim 1 including cable means operated by the loading means for actuating said mounting means.

3. The device of claim 2 including spring means in said actuating means for biasing said mirror to said second of said first and second positions.

4. The device of claim 3 including upright pivot means and means whereby the mirror swings horizontally about the upright pivot means.

5. The device of claim 4 including a second mirror on the opposite side of the truck and means interconnecting the mirrors for simultaneous operation.

6. The device of claim 4, including a lever engageable by an arm of the loading means having said cable means attached thereto.

7. In combination with a truck having a forward driving compartment, a hauling compartment disposed rearwardly of said driving compartment, a pair of lift arms pivoted respectively at the sides of the truck, and a dump bucket secured to and between said arms, and extending transversely across the truck, and swingable by said arms from a first position in front of the truck in an arc over said driving compartment to a second position adjacent said hauling compartment whereby material may be transferred by said dump bucket from the front of the truck and elevated rearwardly to be deposited in said hauling compartment: rear view mirror means for reflecting a view from the rear of the truck into said driver's compartment, and viewable from said driver's compartment; means for movably mounting said rear view mirror means for movement between two positions, one of said positions being transversely outward of the truck from which a clear view to the rear of the truck is seen from the driver's compartment but which lies in the path of movement of one of said arms, the other of said positions being located transversely inward from said first position, and out of the path of movement of said one of said arms, and actuating means engageable by said one of said arms and coupled to said mounting means and operated by pivoting of said arms for moving said mirror out of the path of movement of said one of said arms when said dump bucket moves between said first and second positions thereof.

8. The combination of claim 7, including means for biasing said mirror toward its inward position.

9. The combination of claim 8, wherein said actuating means comprises an actuating arm movably mounted in the path of movement of one of said lift arms at the rearward portion of said path of movement, in position to be engaged by said last-mentioned lift arm, and moved as said lift arm reaches the rearward portion of its path of movement, and means linking said mirror means and said actuating arm for moving said mirror means to its outward position when said actuating arm is engaged and moved by said lift arm.

10. The combination of claim 9, wherein said linking means comprises a flexible cable connected between said actuating arm and said mirror means.

11. The combination of claim 1, wherein said rear view mirror is pivotally mounted to said truck.

12. The combination of claim 1, comprising a second mirror means movably mounted on the opposite side of the truck from said first mentioned rear view mirror and movable from a position outwardly of said truck where it lies in the path of movement of one of said lift arms to another position inwardly of said first position where it is clear of the path of movement of said lift arm; and means for linking said second mirror means to said actuating means to be moved back and forth by movement of said actuating means in substantial synchronism with said first mentioned rear view mirror.

References Cited in the file of this patent

UNITED STATES PATENTS

| | | | |
|---|---|---|---|
| 718,309 | Brown | Jan. 13, | 1903 |
| 2,281,102 | Lowman | Apr. 28, | 1942 |
| 2,456,434 | Manthie | Dec. 14, | 1948 |
| 2,488,316 | Mosby | Nov. 15, | 1949 |
| 2,724,996 | O'Shei | Nov. 29, | 1955 |
| 2,758,508 | Petri et al. | Aug. 14, | 1956 |
| 2,808,161 | Gentile | Oct. 1, | 1957 |
| 2,819,874 | Belec | Jan. 14, | 1958 |
| 2,854,892 | Stark | Oct. 7, | 1958 |
| 2,900,096 | Dempster et al. | Aug. 18, | 1959 |